(12) United States Patent
Anantha et al.

(10) Patent No.: US 10,997,469 B2
(45) Date of Patent: May 4, 2021

(54) METHOD AND SYSTEM FOR FACILITATING IMPROVED TRAINING OF A SUPERVISED MACHINE LEARNING PROCESS

(71) Applicant: MOTOROLA SOLUTIONS, INC., Chicago, IL (US)

(72) Inventors: Aravind Anantha, Malden, MA (US); Mahesh Saptharishi, Boston, MA (US); Yanyan Hu, Medford, MA (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 100 days.

(21) Appl. No.: 16/581,110

(22) Filed: Sep. 24, 2019

(65) Prior Publication Data
US 2021/0089833 A1  Mar. 25, 2021

(51) Int. Cl.
*G06K 9/62* (2006.01)
*G06N 20/00* (2019.01)

(52) U.S. Cl.
CPC ......... *G06K 9/6263* (2013.01); *G06K 9/6215* (2013.01); *G06K 9/6256* (2013.01); *G06N 20/00* (2019.01)

(58) Field of Classification Search
CPC .. G06K 9/6263; G06K 9/6256; G06K 9/6215; G06N 20/00
USPC ......................................................... 382/156
See application file for complete search history.

(56) References Cited

U.S. PATENT DOCUMENTS

| | | | | |
|---|---|---|---|---|
| 9,275,308 | B2* | 3/2016 | Szegedy | G06K 9/4628 |
| 10,140,508 | B2* | 11/2018 | Zhang | G06K 9/00771 |
| 2011/0293136 | A1* | 12/2011 | Porikli | G06N 20/00 |
| | | | | 382/103 |
| 2017/0161645 | A1* | 6/2017 | Cheng | G06N 20/00 |
| 2017/0236013 | A1* | 8/2017 | Clayton | G06K 9/00221 |
| | | | | 382/104 |

OTHER PUBLICATIONS

Shaoqing, "Faster R-CNN: Towards Real-Time Object Detection with Region Proposal Networks," Jan. 6, 2016.*
Kaiming, "Mask R-CNN," Jan. 24, 2018.*
Kraipeerapun, "Binary Classification Using Ensemble Neural Networks and Interval Neutrosophic Sets," Neurocomput., vol. 72, pp. 2845-2856, 2009.*

(Continued)

*Primary Examiner* — Juan A Torres

(57) ABSTRACT

Methods, systems, and techniques for facilitating improved training of a supervised machine learning process, such as a decision tree. First and second object detections of an object depicted in a video are respectively generated using first and second object detectors, with the second object detector requiring more computational resources than the first object detector to detect the object. Whether a similarity and a difference between the first and second object detections respectively satisfy a similarity threshold and a difference threshold is determined. When the similarity threshold is satisfied, the first object detection is stored as a positive example for the machine learning training. When the difference threshold is satisfied, the first object detection is stored as a negative example for the machine learning training.

33 Claims, 7 Drawing Sheets

(56) References Cited

OTHER PUBLICATIONS

Jeatrakul, "Using misclassification analysis for data cleaning. In: International Workshop on Advanced Computational Intelligence and Intelligent Informatics," IWACIII 2009, Nov. 7, 2009.*
Ronny Restrepo: "Intersect over Union(IoU)", http://ronny.rest/tutorials/module/localization_001/Iou/, Jun. 18, 2019, all pages.
Geoffrey Hinton, Oriol Vinyals, Jeff Dean: "Distilling the Knowledge in a Neural Network", NIPS Deep Learning and Representation Learning Workshop (2015), http://arxiv.org/abs/1503.02531, all pages.
Piyasak Jeatrakul et al: "Data cleaning 1-33 for classification using misclassification analysis", Journal of advanced computational intelligence and intelligent informatics, Apr. 20, 2010 (Apr. 20, 2010), pp. 297-302, XP055754280, DOI: 10.20965/jaciii.2010.p0297 Retrieved from the Internet: URL:https://researchrepository.murdoch.edu.au/id/eprint/1310//data_cleaning_2010.pdf; Sections 2.1-2.2; p. 298-p. 299; figure 1.
Rezatofighi Hamid et al: "Generalized Intersection Over Union: A Metric and a Loss for Bounding Box Regression", 2019 IEEE/CVF Conference on Computer Vision and Pattern Recognition (CVPR), IEEE, Jun. 15, 2019 (Jun. 15, 2019), pp. 658-666, XP033687070, DOI: 10.1109/CVPR.2019.00075 [retrieved on Jan. 8, 2020] secion 3.1; p. 4-p. 5.
The International Search Report and the Written Opinion corresponding patent application No. PCT/US2020/048410 filed: Aug. 28, 2020, dated Dec. 7, 2020, all pages.

\* cited by examiner

METHOD AND SYSTEM FOR FACILITATING IMPROVED TRAINING OF A SUPERVISED MACHINE LEARNING PROCESS

TECHNICAL FIELD

The present disclosure is directed at methods, systems, and techniques for facilitating improved training of a supervised machine learning process, such as a decision tree.

BACKGROUND

Computer implemented visual object detection, also called object recognition, pertains to locating and classifying visual representations of real-life objects found in still images or motion videos captured by a camera. By performing visual object detection, each visual object found in the still images or motion video is classified according to its type (such as, for example, human, vehicle, or animal).

Automated security and surveillance systems typically employ video cameras, other image capturing devices or sensors to collect image data such as video. Images represented by the image data may be displayed for contemporaneous screening by security personnel and/or recorded for later review after a security breach.

SUMMARY

According to a first aspect, there is provided a method comprising: obtaining a first object detection of an object depicted in a video that is generated using a first object detector; obtaining a second object detection of the object depicted in the video that is generated using a second object detector, wherein the second object detector requires more computational resources than the first object detector to detect the object; determining whether: a similarity between the first and second object detections satisfies a similarity threshold; or a difference between the first and second object detections satisfies a difference threshold; when the similarity between the first and second object detections satisfies the similarity threshold, storing the first object detection as a positive example for supervised machine learning training; and when the difference between the first and second object detections satisfies the difference threshold, storing the first object detection as a negative example for supervised machine learning training. The examples may be used for training a decision tree.

The first object detector may be implemented on a camera, and the second object detector may be implemented using a server networked to the camera.

The method may further comprise receiving a video clip generated from the video. The video clip may comprise a portion of the video with which the first object detector detects the object and the second object detector may use the video clip to detect the object.

The first object detector may be implemented on a camera, the second object detector may be implemented using a server networked to the camera, the camera may generate the video clip, and the server may receive the video clip from the camera.

The first object detector may be implemented on a camera, the second object detector may be implemented using a server networked to the camera, the camera may generate the video clip and send the video clip to networked storage, and the server may receive the video clip from the networked storage.

The similarity threshold may comprise a minimum intersection over union between the first and second object detections, and a minimum confidence level of the second detection.

The difference threshold may comprise a maximum intersection over union between the first and second object detections, and a maximum confidence level of the second detection.

The difference threshold may comprise a maximum intersection over union between the first and second object detections for all confidence levels of the second detection.

The second object detector may comprise convolutional neural networks performing object detection concurrently.

The method may further comprise training a decision tree using at least one of the positive and negative examples.

The decision tree may be trained using at least 1,000 of the positive and negative examples.

According to another aspect, there is provided a server, comprising: a processor a network interface controller, communicatively coupled to the processor and operable to interface with a camera; and a memory device communicatively coupled to the processor and having stored thereon computer program code that is executable by the processor and that, when executed by the processor, causes the processor to perform a method comprising: obtaining a first object detection of an object depicted in a video that is generated using a first object detector; obtaining a second object detection of the object depicted in the video that is generated using a second object detector, wherein the second object detector requires more computational resources than the first object detector to detect the object; determining whether a similarity between the first and second object detections satisfies a similarity threshold; or a difference between the first and second object detections satisfies a difference threshold; when the similarity between the first and second object detections satisfies the similarity threshold, storing the first object detection as a positive example for supervised machine learning training; and when the difference between the first and second object detections satisfies the difference threshold, storing the first object detection as a negative example for supervised machine learning training.

The first object detector may be implemented on the camera, and the second object detector may be implemented using the server.

The method may further comprise receiving a video clip generated from the video. The video clip may comprise a portion of the video with which the first object detector detects the object and the second object detector may use the video clip to detect the object.

The first object detector may be implemented on the camera, the second object detector may be implemented using the server, the camera may generates the video clip, and the server may receive the video clip from the camera.

The first object detector may be implemented on the camera, the second object detector may be implemented using the server, the camera may generate the video clip and send the video clip to networked storage, and the server may receive the video clip from the networked storage.

The similarity threshold may comprise a minimum intersection over union between the first and second object detections, and a minimum confidence level of the second detection.

The difference threshold may comprise a maximum intersection over union between the first and second object detections, and a maximum confidence level of the second detection.

The difference threshold may comprise a maximum intersection over union between the first and second object detections for all confidence levels of the second detection.

The second object detector may comprise convolutional neural networks performing object detection concurrently.

The method may further comprise training a decision tree using at least one of the positive and negative examples.

The decision tree may be trained using at least 1,000 of the positive and negative examples.

According to another aspect, there is provided a memory device having stored thereon computer program code that is executable by a processor and that, when executed by the processor, causes the processor to perform a method according to any of the foregoing aspects and suitable combinations thereof.

This summary does not necessarily describe the entire scope of all aspects. Other aspects, features and advantages will be apparent to those of ordinary skill in the art upon review of the following description of specific embodiments.

BRIEF DESCRIPTION OF THE DRAWINGS

The detailed description refers to the following figures, in which.

Figure 1:
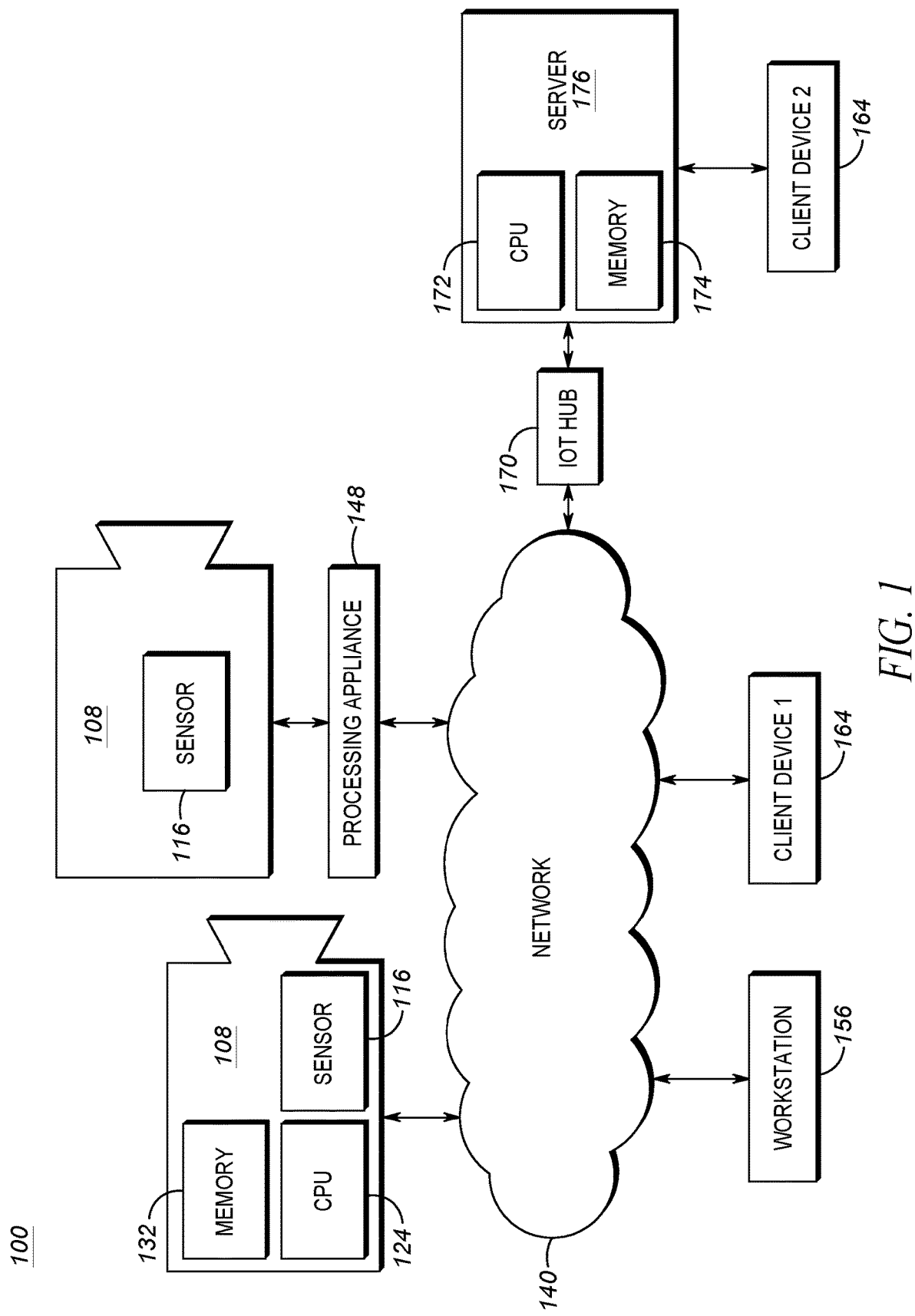
FIG. 1 illustrates a block diagram of connected devices of a video capture and playback system according to an example embodiment.

It will be appreciated that for simplicity and clarity of illustration, elements shown in the figures have not necessarily been drawn to scale. For example, the dimensions of some of the elements may be exaggerated relative to other elements for clarity. Furthermore, where considered appropriate, reference numerals may be repeated among the figures to indicate corresponding or analogous elements.

DETAILED DESCRIPTION

Numerous specific details are set forth in order to provide a thorough understanding of the example embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way but rather as merely describing the implementation of the various embodiments described herein.

The word "a" or "an" in the claims and/or the specification may mean "one", but it is also consistent with the meaning of "one or more", "at least one", and "one or more than one" unless the content clearly dictates otherwise. Similarly, the word "another" may mean at least a second or more unless the content clearly dictates otherwise. Additionally, as used herein the term "and/or" in the context of a list of items means any one or more of those items (e.g., "A, B, and/or C" means "any one or more of A, B, and C").

The terms "coupled", "coupling" or "connected" as used herein can have several different meanings depending in the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through an intermediate elements or devices via an electrical element, electrical signal or a mechanical element depending on the particular context.

Herein, an image may include a plurality of sequential image frames, which together form a video captured by the video capture device. Each image frame may be represented by a matrix of pixels, each pixel having a pixel image value. For example, the pixel image value may be a numerical value on grayscale (ex; 0 to 255) or a plurality of numerical values for colored images. Examples of color spaces used to represent pixel image values in image data include RGB, YUV, CYKM, YCBCR 4:2:2, YCBCR 4:2:0 images.

Processing video may include, but is not limited to, image processing operations, analyzing, managing, compressing, encoding, storing, transmitting and/or playing back the video data. Analyzing the video may include segmenting areas of image frames and detecting visual objects, and/or tracking and/or classifying visual objects located within the captured scene represented by the image data. The processing of the image data may also cause additional information regarding the image data or visual objects captured within the images to be output. For example, such additional information is commonly understood as metadata. The metadata may also be used for further processing of the image data, such as drawing bounding boxes around detected objects in the image frames. "Metadata" or variants thereof herein refers to information obtained by computer-implemented analysis of images including images in video.

As will be appreciated by one skilled in the art, the various example embodiments described herein may be embodied as a method, system, or computer program product. Accordingly, the various example embodiments may take the form of an entirely hardware embodiment, an entirely software embodiment (including firmware, resident software, microcode, etc.) or an embodiment combining software and hardware aspects that may all be referred to herein as, for example, a "module" or a "system." Furthermore, the various example embodiments may take the form of a computer program product on a computer-usable storage medium having computer-usable program code embodied in the medium.

Any suitable computer-usable or computer readable medium may be utilized. The computer-usable or computer-readable medium may be, for example but not limited to, an electronic, magnetic, optical, electromagnetic, infrared, or semiconductor system, apparatus, device, or propagation medium. In the context of this document, a computer-usable or computer-readable medium may be any medium that can contain, store, communicate, propagate, or transport the program for use by or in connection with the instruction execution system, apparatus, or device.

Computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

Various example embodiments are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Referring now to FIG. 1, therein illustrated is a block diagram of connected devices of a video capture and playback system 100 according to an example embodiment. For example, the video capture and playback system 100 may be installed and configured to operate as a video surveillance system. The video capture and playback system 100 includes hardware and software that perform the processes and functions described herein.

The video capture and playback system 100 includes a video capture device 108 being operable to capture a plurality of images and produce image data representing the plurality of captured images. The video capture device 108 or camera 108 is an image capturing device and includes security video cameras.

Each video capture device 108 includes an image sensor 116 for capturing a plurality of images. The video capture device 108 may be a digital video camera and the image sensor 116 may output captured light as a digital data. For example, the image sensor 116 may be a CMOS, NMOS, or CCD. In some embodiments, the video capture device 108 may be an analog camera connected to an encoder.

The image sensor 116 may be operable to capture light in one or more frequency ranges. For example, the image sensor 116 may be operable to capture light in a range that substantially corresponds to the visible light frequency range. In other examples, the image sensor 116 may be operable to capture light outside the visible light range, such as in the infrared and/or ultraviolet range. In other examples, the video capture device 108 may be a multi-sensor camera that includes two or more sensors that are operable to capture light in same or different frequency ranges.

The video capture device 108 may be a dedicated camera. It will be understood that a dedicated camera herein refers to a camera whose principal features is to capture images or video. In some example embodiments, the dedicated camera may perform functions associated with the captured images or video, such as but not limited to processing the image data produced by it or by another video capture device 108. For example, the dedicated camera may be a surveillance camera, such as any one of a pan-tilt-zoom camera, dome camera, in-ceiling camera, box camera, and bullet camera.

Additionally, or alternatively, the video capture device 108 may include an embedded camera. It will be understood that an embedded camera herein refers to a camera that is embedded within a device that is operational to perform functions that are unrelated to the captured image or video. For example, the embedded camera may be a camera found on any one of a laptop, tablet, drone device, smartphone, video game console or controller.

Each video capture device 108 includes a processor 124, a memory device 132 coupled to the processor 124 and a network interface. The memory device can include a local memory (such as, for example, a random access memory and a cache memory) employed during execution of program instructions. The processor executes computer program instructions (such as, for example, an operating system and/or application programs), which can be stored in the memory device.

In various embodiments the processor 124 may be implemented by any suitable processing circuit having one or more circuit units, including a digital signal processor (DSP), graphics processing unit (GPU) embedded processor, a visual processing unit or a vision processing unit (both referred to herein as "VPU"), etc., and any suitable combination thereof operating independently or in parallel, including possibly operating redundantly. Such processing circuit may be implemented by one or more integrated circuits (IC), including being implemented by a monolithic integrated circuit (MIC), an Application Specific Integrated Circuit (ASIC), a Field Programmable Gate Array (FPGA), etc. or any suitable combination thereof. Additionally or alternatively, such processing circuit may be implemented as a programmable logic controller (PLC), for example. The processor may include circuitry for storing memory, such as digital data, and may comprise the memory circuit or be in wired communication with the memory circuit, for example.

In various example embodiments, the memory device 132 coupled to the processor circuit is operable to store data and computer program instructions. Typically, the memory device is all or part of a digital electronic integrated circuit or formed from a plurality of digital electronic integrated circuits. The memory device may be implemented as Read-Only Memory (ROM), Programmable Read-Only Memory (PROM), Erasable Programmable Read-Only Memory (EPROM), Electrically Erasable Programmable Read-Only Memory (EEPROM), flash memory, one or more flash drives, universal serial bus (USB) connected memory units, magnetic storage, optical storage, magneto-optical storage, etc. or any combination thereof, for example. The memory device may be operable to store memory as volatile memory, non-volatile memory, dynamic memory, etc. or any combination thereof.

In various example embodiments, a plurality of the components of the video capture device 108 may be implemented together within a system on a chip (SOC). For example, the processor 124, the memory device 132 and the network interface may be implemented within a SOC. Furthermore, when implemented in this way, a general purpose processor and one or more of a GPU or VPU, and a DSP may be implemented together within the SOC.

Continuing with FIG. 1, each of the video capture devices 108 is connected to a network 140. Each video capture device 108 is operable to output image data representing images that it captures and transmit the image data over the network.

It will be understood that the network 140 may be any suitable communications network that provides reception and transmission of data. For example, the network 140 may be a local area network, external network (such as, for example, a WAN, or the Internet) or a combination thereof. In other examples, the network 140 may include a cloud network.

In some examples, the video capture and playback system 100 includes a processing appliance 148. The processing appliance 148 is operable to process the image data output by a video capture device 108. The processing appliance 148 also includes one or more processors and one or more memory devices coupled to a processor (CPU). The processing appliance 148 may also include one or more network interfaces. For convenience of illustration, only one processing appliance 148 is shown; however it will be understood that the video capture and playback system 100 may include any suitable number of processing appliances 148.

For example, and as illustrated, the processing appliance 148 is connected to a video capture device 108 which may not have memory 132 or CPU 124 to process image data. The processing appliance 148 may be further connected to the network 140.

According to one example embodiment, and as illustrated in FIG. 1, the video capture and playback system 100 includes a workstation 156, each having one or more processors including graphics processing units (GPUs). The workstation 156 may also include storage memory. The workstation 156 receives image data from at least one video capture device 108 and performs processing of the image data. The workstation 156 may further send commands for managing and/or controlling one or more of the video capture devices 108. The workstation 156 may receive raw image data from the video capture device 108. Alternatively, or additionally, the workstation 156 may receive image data that has already undergone some intermediate processing, such as processing at the video capture device 108 and/or at a processing appliance 148. The workstation 156 may also receive metadata from the image data and perform further processing of the image data.

It will be understood that while a single workstation 156 is illustrated in FIG. 1, the workstation may be implemented as an aggregation of a plurality of workstations.

FIG. 1 also depicts a server 176 that is communicative with the cameras 108, processing appliance 148, and workstation 156 via the network 140 and an Internet-of-things hub 170 ("IOT hub"). The server 176 may be an on-premises server or be hosted off-site (e.g., a public cloud). The server 176 comprises one or more processors 172, one or more memory devices 174 coupled to the one or more processors 172, and one or more network interfaces. As with the cameras 108, the memory device 174 can include a local memory (such as, for example, a random access memory and a cache memory) employed during execution of program instructions. The processor 172 executes computer program instructions (such as, for example, an operating system and/or application programs), which can be stored in the memory device 174. In at least some example embodiments, circuitry or other implementations of the processor 124 and memory device 132 of the cameras 108 may also be used for the processor 172 and memory device 174 of the server 176. In at least some example embodiments, the IOT hub 170 is a cloud-hosted, managed service that bi-directionally connects the server 176 to the rest of the network 140 and the devices connected to it, such as the camera 108. The IOT hub 170 may, for example, comprise part of the Microsoft™ Azure™ cloud computing platform, and the server 176 may accordingly be cloud-hosted using the Microsoft™ Azure™ platform. Different example embodiments are possible. For example, the IOT hub 170 may be replaced with one or more of an Ethernet hub, router, and switch (managed or unmanaged), regardless of whether the server 176 is cloud-hosted. The server 176 may additionally or alternatively be directly connected to any one or more of the other devices of the system 100. Further, while use of the IOT hub 170 implies that the server 176 is networked to a large number of Internet-connected computing appliances, this may be the case in certain embodiments and not in others. For example, the system 100 may comprise a very large number of the cameras 108; alternatively, the system 100 may comprise only a handful of cameras 108 and other network-connected devices or appliances, and the IOT hub 170 may nonetheless still be used.

Any one or more of the cameras 108, processing appliance 148, and workstation 156 may act as edge devices that communicate with the server 176 via the network 140 and IOT hub 174. Any of the edge devices may, for example, perform initial processing on captured video and subsequently send some or all of that initially processed video to the server 176 for additional processing. For example, the camera 108 may apply a first type of video analytics to analyze video captured using the camera 108 to detect an object or identify an event and to then generate a video clip of a certain duration that includes that object or event. The camera 108 may then send the video clip and metadata describing that object or event to the server 176 for more robust processing using a second type of video analytics that requires more computational resources than the first type of video analytics and that is accordingly unsuitable for deployment on the camera 108.

The video capture and playback system 100 further includes a pair of client devices 164 connected to the network 140. In FIG. 1, a first client device 164 is connected to the network 140, and a second client device 164 is connected to the server 176. The client device 164 is used by one or more users to interact with the video capture and playback system 100. Accordingly, the client device 164 includes a display device and a user input device (such as, for example, a mouse, keyboard, or touchscreen). The client device 164 is operable to display on its display device a user interface for displaying information, receiving user input, and playing back video. For example, the client device may be any one of a personal computer, laptop, tablet, personal data assistant (PDA), cell phone, smart phone, gaming device, and other mobile device.

The client device 164 is operable to receive image data over the network 140 and is further operable to playback the received image data. A client device 164 may also have functionalities for processing image data. For example, processing functions of a client device 164 may be limited to processing related to the ability to playback the received image data. In other examples, image processing functionalities may be shared between the workstation 156 and one or more client devices 164.

In some examples, the image capture and playback system 100 may be implemented without the workstation 156 and/or the server 176. Accordingly, image processing functionalities may be wholly performed on the one or more video capture devices 108. Alternatively, the image processing functionalities may be shared amongst two or more of the video capture devices 108, processing appliance 148 and client devices 164.

Figure 2A:
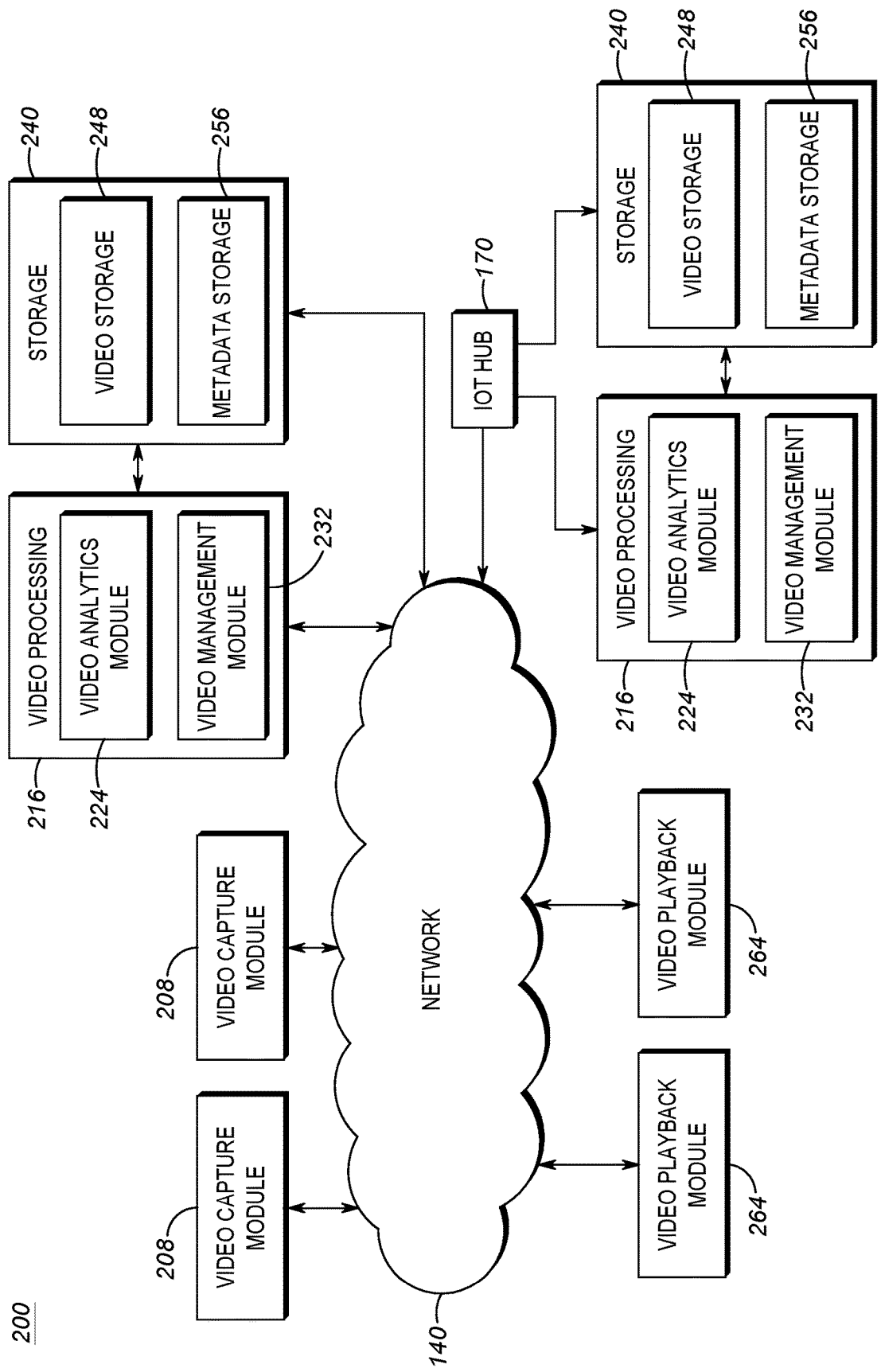
FIG. 2A illustrates a block diagram of a set of operational modules of the video capture and playback system according to an example embodiment.

Referring now to FIG. 2A, therein illustrated is a block diagram of a set 200 of operational modules of the video capture and playback system 100 according to one example embodiment. The operational modules may be implemented in hardware, software or both on one or more of the devices of the video capture and playback system 100 as illustrated in FIG. 1.

The set 200 of operational modules includes video capture modules 208 (two shown for purposes of illustration; however any suitable number is contemplated). For example, each video capture device 108 may implement a video capture module 208. The video capture module 208 is operable to control one or more components (such as, for example, sensor 116) of a video capture device 108 to capture images.

The set 200 of operational modules includes a subset 216 of image data processing modules. For example, and as illustrated, the subset 216 of image data processing modules includes a video analytics module 224 and a video management module 232.

The video analytics module 224 receives image data and analyzes the image data to determine properties or characteristics of the captured image or video and/or of objects found in the scene represented by the image or video. Based on the determinations made, the video analytics module 224 may further output metadata providing information about the determinations. Examples of determinations made by the video analytics module 224 may include one or more of foreground/background segmentation, object detection, object tracking, object classification, virtual tripwire, anomaly detection, facial detection, facial recognition, license plate recognition, identifying objects "left behind" or "removed", unusual motion, and business intelligence. However, it will be understood that other video analytics functions known in the art may also be implemented by the video analytics module 224.

The video management module 232 receives image data and performs processing functions on the image data related to video transmission, playback and/or storage. For example, the video management module 232 can process the image data to permit transmission of the image data according to bandwidth requirements and/or capacity. The video management module 232 may also process the image data according to playback capabilities of a client device 164 that will be playing back the video, such as processing power and/or resolution of the display of the client device 164. The video management module 232 may also process the image data according to storage capacity within the video capture and playback system 100 for storing image data.

It will be understood that according to some example embodiments, the subset 216 of video processing modules may include only one of the video analytics module 224 and the video management module 232.

The set 200 of operational modules further include a subset 240 of storage modules. For example, and as illustrated, the subset 240 of storage modules include a video storage module 248 and a metadata storage module 256. The video storage module 248 stores image data, which may be image data processed by the video management module. The metadata storage module 256 stores information data output from the video analytics module 224.

It will be understood that while video storage module 248 and metadata storage module 256 are illustrated as separate modules, they may be implemented within a same hardware storage whereby logical rules are implemented to separate stored video from stored metadata. In other example embodiments, the video storage module 248 and/or the metadata storage module 256 may be implemented using hardware storage using a distributed storage scheme.

The set of operational modules further includes video playback modules 264 (two shown for purposes of illustration; however any suitable number is contemplated), which is operable to receive image data and playback the image data as a video. For example, the video playback module 264 may be implemented on a client device 164.

The operational modules of the set 200 may be implemented on one or more of the video capture device 108, processing appliance 148, workstation 156, server 176, and client device 164. In some example embodiments, an operational module may be wholly implemented on a single device. For example, the video analytics module 224 may be wholly implemented on the workstation 156. Similarly, the video management module 232 may be wholly implemented on the workstation 156.

In other example embodiments, some functionalities of an operational module of the set 200 may be partly implemented on a first device while other functionalities of an operational module may be implemented on a second device. For example, video analytics functionalities may be split between two or more of the video capture device 108, processing appliance 148, server 176, and workstation 156. Similarly, video management functionalities may be split between two or more of an video capture device 108, processing appliance 148, server 176, and workstation 156.

Figure 2B:
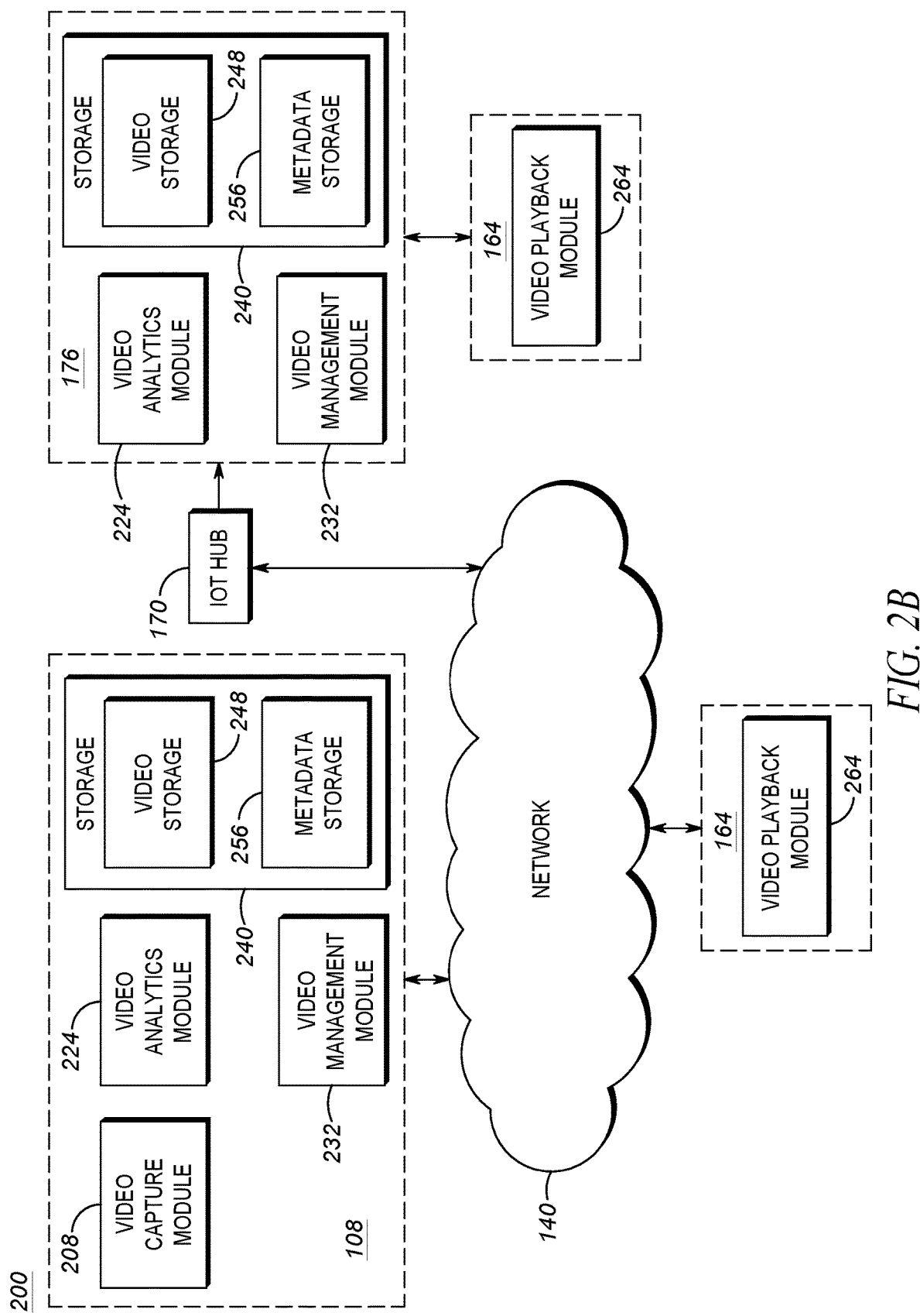
FIG. 2B illustrates a block diagram of a set of operational modules of the video capture and playback system according to one particular example embodiment in which a video analytics module, a video management module, and storage are wholly implemented on each of a video capture device and a server.

Referring now to FIG. 2B, therein illustrated is a block diagram of a set 200 of operational modules of the video capture and playback system 100 according to one particular example embodiment in which the video analytics module 224, the video management module 232, and the storage 240 is wholly implemented on each of the camera 108 and the server 176. The video analytics module 224, the video management module 232, and the storage 240 may additionally or alternatively be wholly or partially implemented on one or more processing appliances 148. The video playback module 264 is implemented on each of the client devices 164, thereby facilitating playback from either device. As mentioned above in respect of FIG. 1, the video analytics implemented on the camera 108 and on the server 176 may complement each other. For example, the camera's 108 video analytics module 224 may perform a first type of video analytics, and send the analyzed video or a portion thereof to the server 176 for additional processing by a second type of video analytics using the server's 176 video analytics module 224.

It will be appreciated that allowing the subset 216 of image data (video) processing modules to be implemented on a single device or on various devices of the video capture and playback system 100 allows flexibility in building the system 100.

For example, one may choose to use a particular device having certain functionalities with another device lacking those functionalities. This may be useful when integrating devices from different parties (such as, for example, manufacturers) or retrofitting an existing video capture and playback system.

Typically, limited processing power is available on board the camera 108. The object detections generated by the camera's 108 video analytics module 224 accordingly are subject to, in at least some example embodiments, errors in the form of a material number of false positives (i.e., detecting an object when no object is present) and/or false negatives (i.e., failing to detect an object when the object is present). In order to mitigate these errors, the object detections that the camera's 108 video analytics module 224 outputs may be further processed by a decision tree implemented, for example, on the server 176, client device 164, processing appliance 148, and/or workstation 156. The decision tree filters out at least some false positives and negatives and acts as another filter that the system 100 uses to process camera detections prior to displaying them to a user.

For practical applications, the decision tree is trained prior to being relied upon. The decision tree may be trained manually. For example, a user may manually mark a certain number of example detections generated by the camera 108 as being accurate (a "positive example") or as being inaccurate (a "negative example"), and then use the positive and negative examples to train the decision tree. Training a decision tree may comprise, for example, one or both of induction and pruning of the decision tree. The user may, for example, mark thirty positive examples and thirty negative examples. However, manually marking detections is tedious for the user, inefficient, and is a disincentive to using the decision tree.

In at least some example embodiments herein, positive and negative examples are generated automatically and can be used to train the decision tree, thereby increasing system efficiency relative to a system in which the decision tree is manually trained. More particularly, in at least some example embodiments a first object detector runs on the camera 108 and a second object detector runs on a device with more computational resources (i.e. a greater available amount of computational resources) than the camera 108, such as the server 176. By virtue of having access to greater computational resources, the second object detector is able to, on average, generate more accurate detections than the first object detector. The first and second object detectors process video and respectively generate first and second object detections. When the first and second object detections satisfy a similarity threshold, the system 100 treats the first object detection as a positive example; analogously, when the first and second object detections satisfy a difference threshold, the system 100 treats the first object detection as a negative example. The system 100 may store the positive and negative examples in a file for subsequent use in training the decision tree.

While the following example embodiments use a decision tree as an example type of machine learning, more generally the positive and negative examples generated according to the example embodiments herein may be used to train any suitable supervised machine learning process that may use such examples for training. For example, in addition to being used to train a decision tree, the examples may be used to train support vector machines, linear regression, and logistic regression processes.

Figure 3:
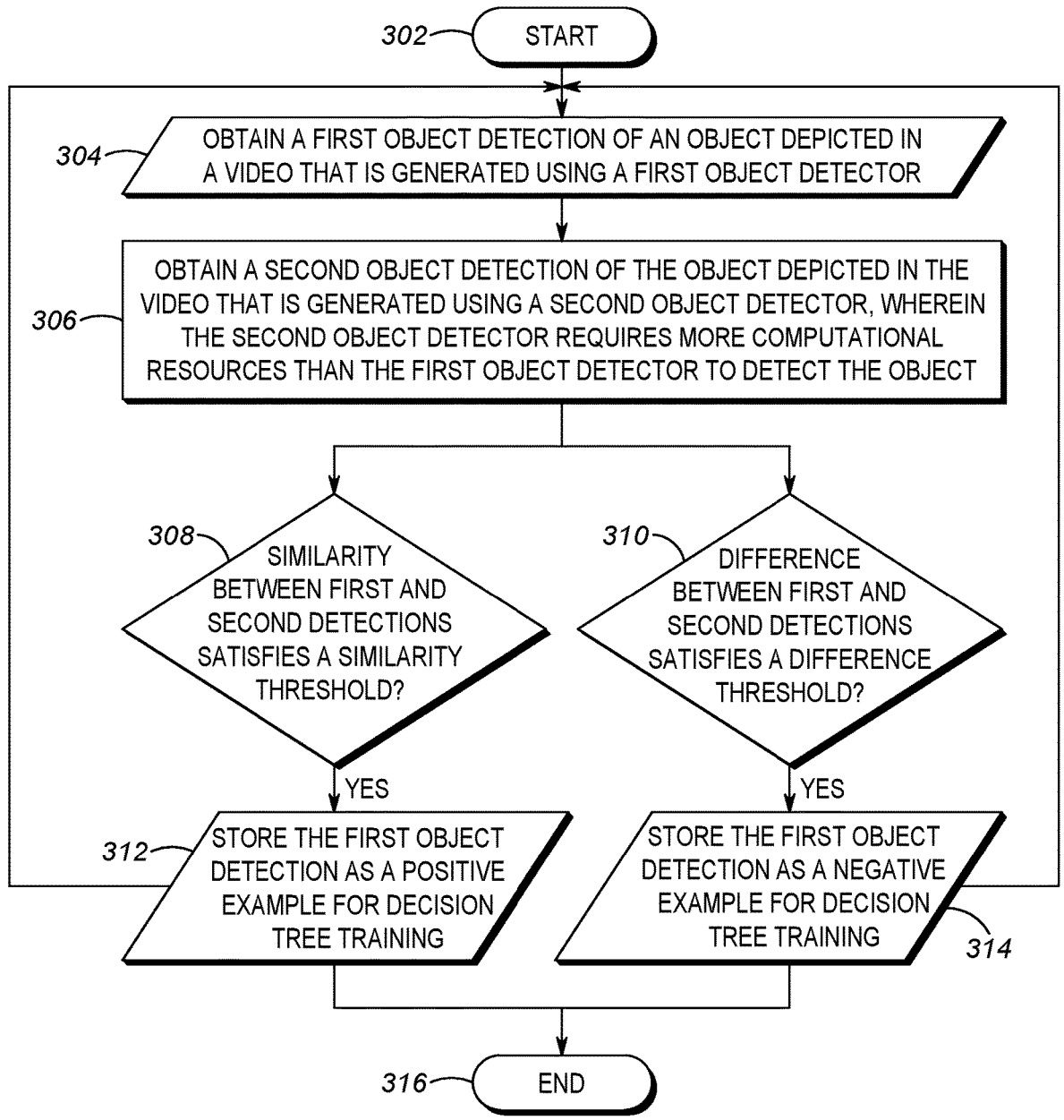
FIG. 3 is a flow chart depicting a method for facilitating improved decision tree training, according to an example embodiment.

Referring now to FIG. 3, there is depicted a method 300 for facilitating improved decision tree training, according to an example embodiment. In at least the presently described embodiment, the method 300 is expressed as computer program code and stored on the memory device 174 of the server 176 for performance by the server's 176 processor 172. However, in at least some different example embodiments another device comprising part of the system 100 may partially or entirely perform the method 300.

The method 300 begins at block 302. The processor 172 may begin performing the method 300 in response to a notification from the video analytics module 224 that an object in the video has been detected, for example. After block 302 the processor 172 proceeds to block 304 where it obtains a first object detection of an object depicted in a video that is generated using a first object detector. The object may be, for example, a person or vehicle. In at least the presently described example embodiment, the first object detector is implemented in the camera's 108 video analytics module 224.

The camera's 108 video analytics module 224 also creates a video clip generated from the video in which the object is depicted. The video clip comprises a portion of the video that the first object detector processes to detect the object. For example, the object may be detected at a certain time t on the video. The camera's 108 video analytics module 224 may then generate a video clip that includes the video at time t; for example, the video analytics module 224 may generate a ten second long video clip that is centered on time t. The camera 108 then sends the video clip, together with the metadata representing the first object detection, to the server 176.

The server 176 receives the video clip from the camera 108 and, at block 306, the server's 176 processor 172 obtains, by using the video clip to generate, a second object detection of the object depicted in the video using a second object detector that is implemented in the server's 176 video analytics module 224. The second object detector requires more computational resources than the first object detector to detect the object and accordingly is able to generate a detection that may be more accurate and/or associated with a higher confidence level than the first object detection. An example manner of generating the second object detection using convolutional neural networks (each a "CNN") is discussed in more detail in respect of FIG. 4, below. In at least the presently described embodiment, the server 176 receives the entire video in addition to the video clip from the camera 108; in at least some different example embodiments, the server 176 may receive only the video clip or only the video. In embodiments in which the server 176 receives the video from the camera 108, the server's 176 video analytics module 224 may apply video analytics to process the video, regardless of whether it also processes the video clip. Instead of receiving the video clip from the camera 108, the camera 108 may send the video clip to networked storage, and the server 176 may receive the video clip from the networked storage such as through a URL. The networked storage may comprise, for example, the video storage module 248 implemented on another server or computing device not depicted in FIG. 1.

After block 306, the processor 172 has the first and second object detections and assesses whether the similarity between them satisfies a similarity threshold (block 308) or whether the difference between them satisfies a difference threshold (block 310). If the first and second object detections are sufficiently similar, the processor 172 stores the first object detection as a positive example for decision tree training (block 312). Alternatively, if the first and second object detections are sufficiently different, the processor 172 stores the first object detection as a negative example for decision tree training (block 314). The method 300 subsequently ends at block 316.

Figure 5:
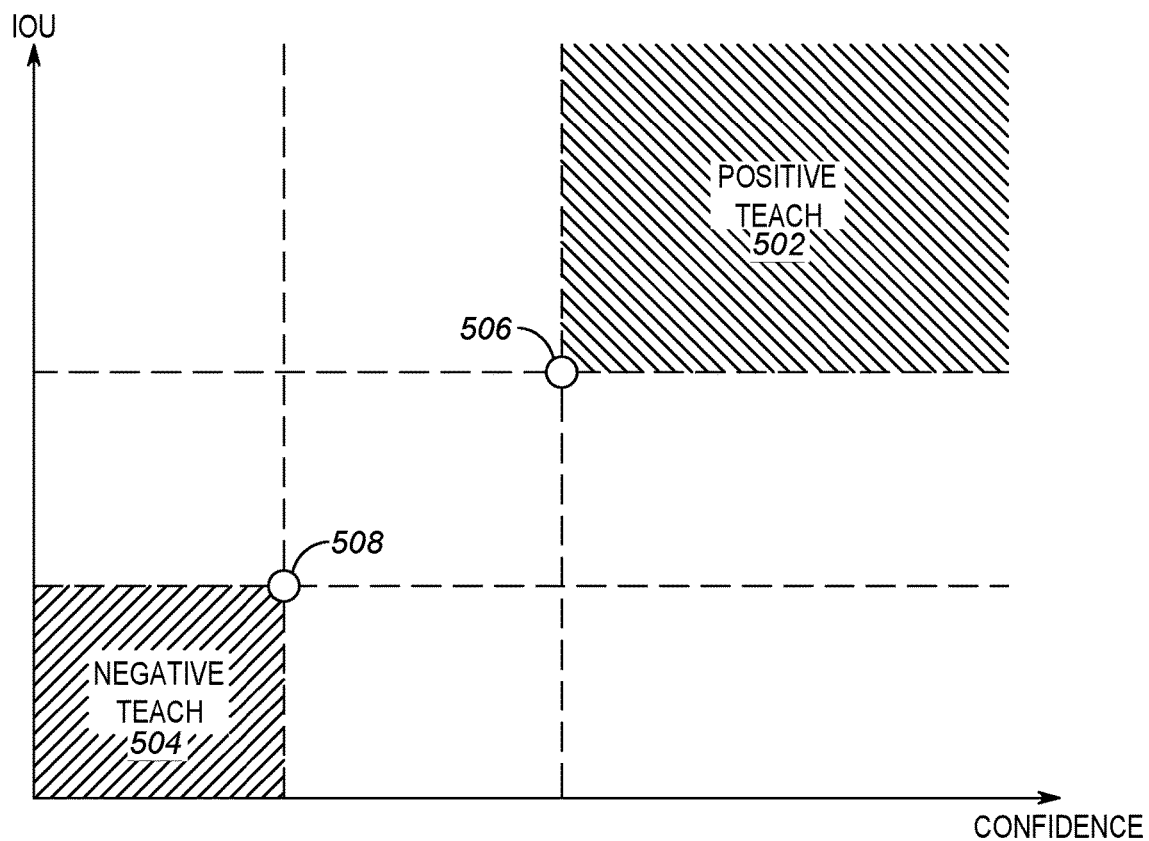
FIG. 5 is a two-dimensional plot graphically depicting intersection over union of first and second object detections vs. a confidence level of the second detection, which is applied when performing the method of FIG. 3.

In order to permit meaningful comparisons at blocks 308 and 310, the first and second object detections are for analogous classifications (e.g., for the same object). Example similarity and difference thresholds are respectively depicted as first and second points 506,508 on a graph 500 shown in FIG. 5. The graph 500 of FIG. 5 is of intersection over union ("IOU") of the first and second detection results vs. the confidence level of the second detection result. The confidence level of the second detection result is used as it is typically more reliable than the confidence level of the first detection result by virtue of the second object detector using greater computational resources; regardless, in at least some example embodiments, the confidence level of the first detection result may alternatively or additionally be used in FIG. 5.

The first point 506 represents a minimum IOU between the first and second object detections, and a minimum confidence level of the second detection; an example minimum IOU is 0.7 or 0.75 and an example minimum confidence level is 0.7. The first point 506 defines a positive example area 502 that is the area of the graph 500 for which the first and second object detections are sufficiently similar to qualify the first object detection as a positive example at blocks 308 and 312. Analogously, the second point 508 represents a maximum IOU between the first and second object detections, and a maximum confidence level of the second detection; an example maximum IOU is 0.25 and an example maximum confidence level is 0.3. The second point 508 defines a negative example area 504 that is the area of the graph 500 for which the first and second object detections are sufficiently different to qualify the first object detection as a negative example at blocks 310 and 314. In at least the presently described example embodiment, the processor 172 does not use the portion of the graph 500 outside the positive and negative example areas 502,504 to determine whether the first object detection is to be classified as a positive or negative example. However, in at least some other example embodiments the sizes of one or both of the positive and negative example areas 502,504 may change by changing the location of the first and/or second points 506,508. More generally, the processor 172 may use any suitable one or more portions of the graph 500 to determine whether the first object detection is to be classified as a positive or negative example. For example, the negative example area 504 may span all confidence levels of the second object detection so long as the IOU of the first and second object detections is less than or equal to a maximum IOU; this maximum IOU in at least some embodiments is zero so as to reduce the likelihood of a false negative.

While the graph of FIG. 5 is of IOU vs. the confidence level of the second object detection, in at least some other example embodiments the similarity and/or difference thresholds may be defined using different parameters and/or a different number of parameters. For example, the similarity and/or difference thresholds may be defined using IOU alone, or the confidence level of the first detection may be used as an alternative to or in conjunction with the confidence level of the second detection. As another example, IOU may be replaced with a different suitable metric, such as pixel accuracy.

Figure 4:
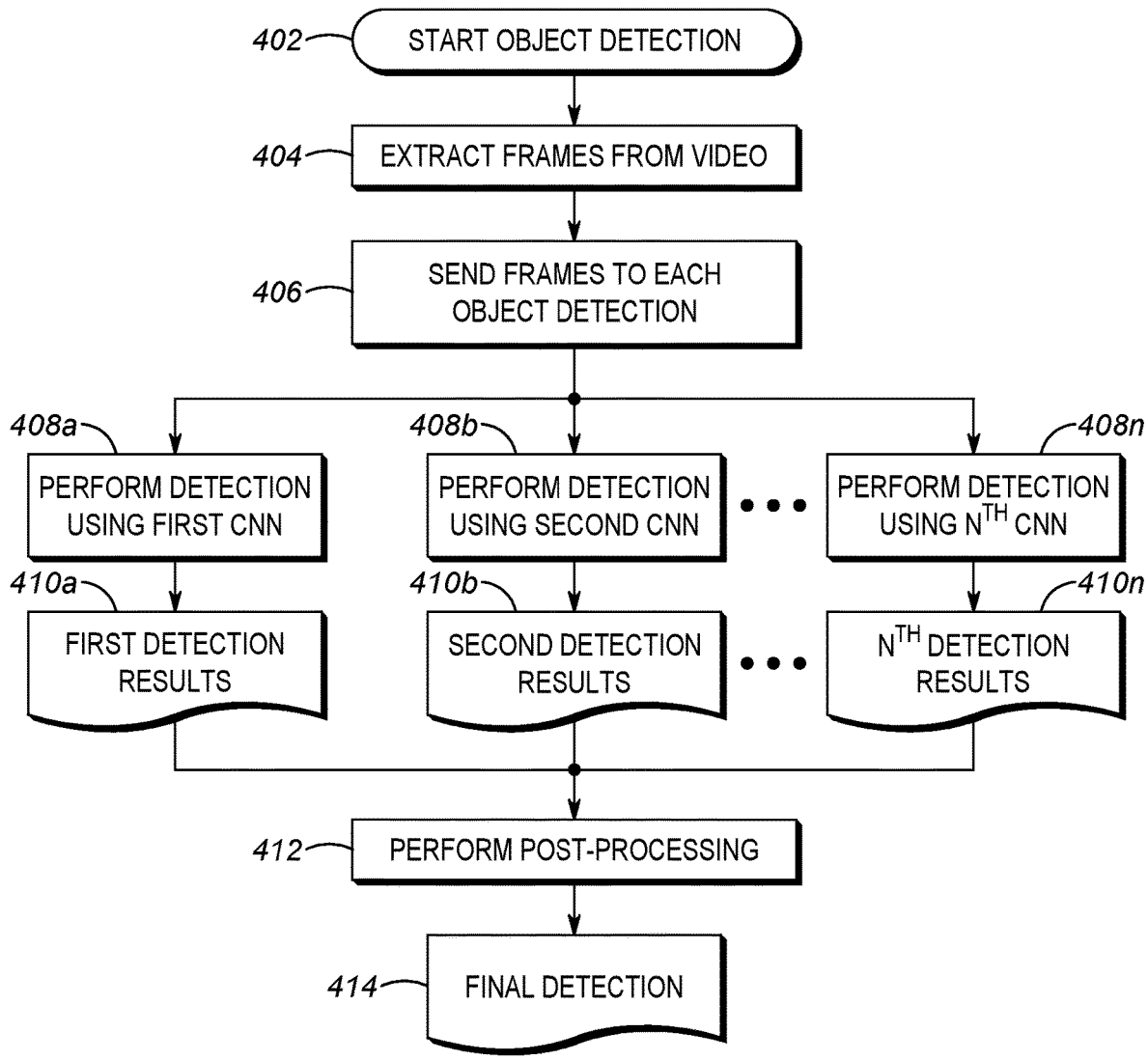
FIG. 4 is a flow chart depicting a method for object detection using multiple convolutional neural networks, which is performed as part of the method of FIG. 3.

Referring now to FIG. 4, there is depicted a method 400 for object detection using multiple CNNs. The method 400 may be performed by the server's 176 processor 172 at block 306 of the method 300 of FIG. 3.

In FIG. 4, object detection starts at block 402 following which the processor 172 proceeds to block 404 where it extracts frames from video. When the server 176 receives the video clip from the camera 108 as described above in respect of FIG. 3, the processor 172 extracts frames from the video clip. Once the frames are extracted, the processor 172 proceeds to block 406 where the frames are sent to each of the CNNs used for object detection. FIG. 4 depicts any suitable number n CNNs performing object detection on the video frames concurrently at blocks 408a-n, with the n CNNs respectively outputting first through $n^{th}$ object detection results at blocks 410a-n. While FIG. 4 shows n CNNs performing object detection concurrently, in at least some different embodiments at least some of the CNNs may perform object detection non-concurrently. For example, one of the CNNs may complete object detection, following which another of the CNNs commences object detection. Various types of CNNs are suitable for use in FIG. 4. For example, in at least one example embodiment, three CNNs are used, with at least one Faster R-CNN and at least one Mask R-CNN being used, as described in Shaoqing Ren et al., "Faster R-CNN: Towards Real-Time Object Detection with Region Proposal Networks," arXiv:1506.01497v3 [cs.CV], Jan. 6, 2016, and Kaiming He et al., "Mask R-CNN," arXiv:1703.06870v3 [cs.CV], Jan. 24, 2018, the entireties of both of which are incorporated by reference. Regardless of the number and type of CNNs used for blocks 408a-n, the processor 172 performs post-processing on the first through $n^t$ detection results 410a-n at block 412 to select a single one of the detections 410a-n as the final detection 414. The post-processing may comprise, for example, applying non-maximum suppression with a heat map based on the detections' 410a-n confidence levels. Using multiple CNNs in FIG. 4 helps to reduce the false negative rate, while applying non-maximum suppression with a heat map helps to reduce the false positive rate. Different techniques may additionally or alternatively be used to address the false positive rate and/or the false negative rate. For example, multi-scale inferencing (resizing input images to multiple scales and then feeding them to the same CNN for processing) may be used to reduce the false negative rate, and cascading classifiers after the detection results 410a-n in FIG. 4 may be used to reduce the false positive rate.

Figure 6:
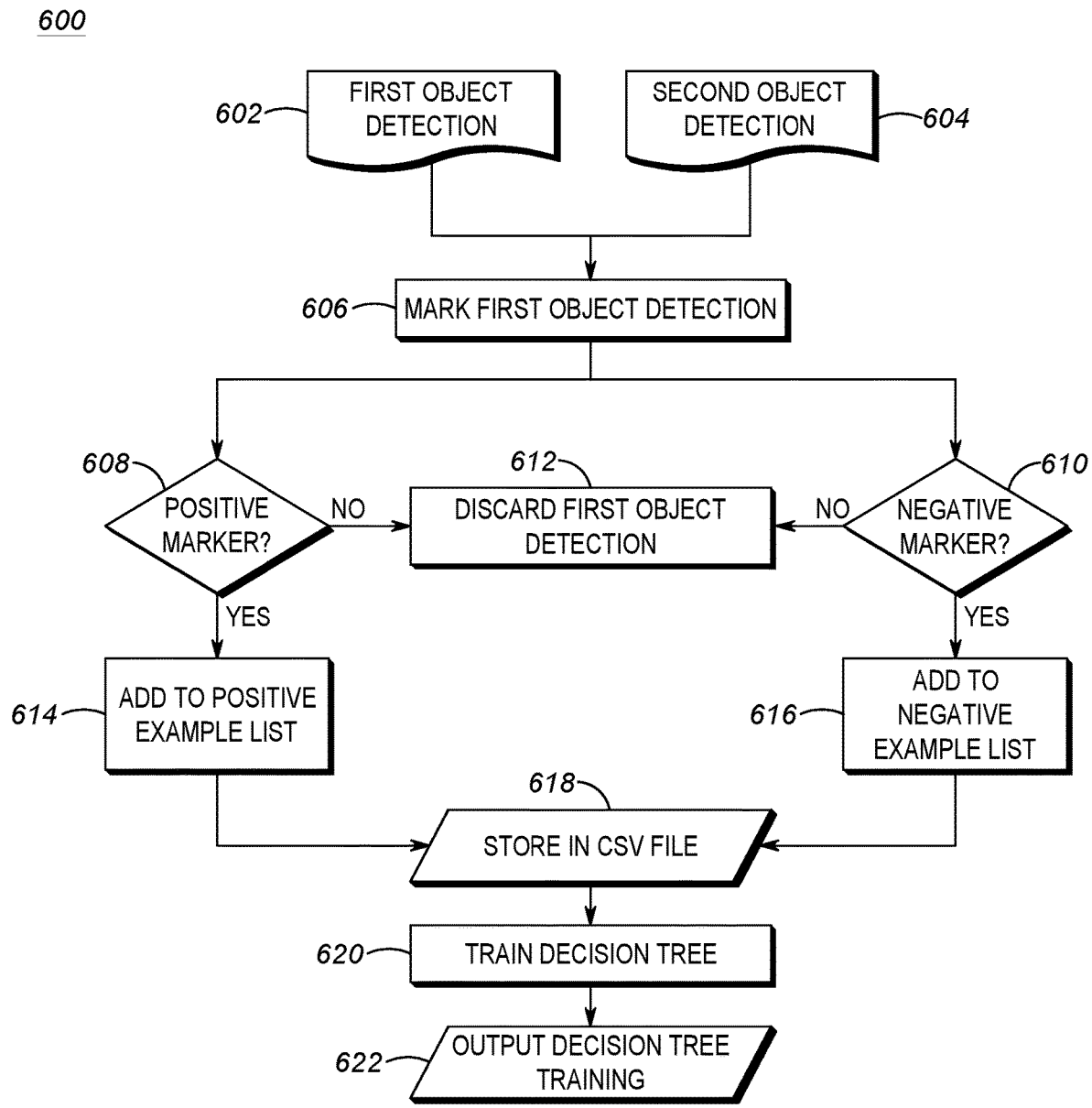
FIG. 6 is a flow chart depicting a method for facilitating improved decision tree training, according to an example embodiment.

Referring now to FIG. 6, there is depicted a method 600 for facilitating improved decision tree training, according to an example embodiment. As with the method 300 of FIG. 3, in at least the presently described example embodiment the server's 176 processor 172 performs the method 600 of FIG. 6, although in at least some different example embodiments another device comprising part of the system 100 may partially or entirely perform the method 600.

The processor 172 obtains the first and second object detections at blocks 602 and 604, respectively. The processor 172 may receive the first object detection from the camera 108 and generate the second object detection itself, as described above in respect of FIG. 3; alternatively, the processor 172 may receive both the first and second object detections from another device in the system 100, or generate both itself.

The processor 172 proceeds to block 606 where it marks the first object detection if the first object detection is sufficiently similar to, or sufficiently different from, the second object detection as described above in FIG. 3 in respect of blocks 308 and 310. If the first and second object detections satisfy the similarity threshold described above for FIG. 3, the processor 172 marks the first object detection with a positive marker alternatively, if the first and second object detections satisfy the difference threshold described above for FIG. 3, the processor 172 marks the first object detection with a negative marker. "Marking" in this context may refer to adding or altering metadata stored in the server's 176 metadata storage module 256 that associated with the first object detection.

After block 606, the processor 172 determines whether the first object detection is marked with a positive marker (block 608) or a negative marker (block 610). If neither, the processor 172 discards the first object detection (block 612). Alternatively, if the first object detection is marked with a positive marker, the processor 172 adds it to a positive example list (block 614); and if the first object detection is marked with a negative marker, the processor 172 adds it to a negative example list (block 616). The processor 172 subsequently stores the list of positive and negative examples in a comma-separated value ("CSV") file at block 618, which the processor 172 uses to train the decision tree at block 618. While a CSV file is used in FIG. 6, in at least some different example embodiments a different and suitable file type may be used to train the decision tree. The processor 172 outputs the results of the decision tree training at block 622; the output may be in extensible markup language ("XML") or another suitable format.

In at least some example embodiments, the decision tree training at block 620 is performed only after the CSV file referenced at block 618 has a sufficiently high number of positive and negative examples (e.g., 1,000) and not every time a new positive or negative example is added to the CSV file. For videos in which objects are relatively rare, the processor 172 performs blocks 606-618 for all detected objects and waits until the CSV file has a sufficient number of examples to suitably train the decision tree. For videos depicting a large enough number of objects that not all of them need to be used to train the decision tree (e.g., the computational cost of additional decision tree training outweighs the benefit of the training), the processor 172 selects a subset of available objects for training. For example, the processor 172 may randomly sample objects from the video and use those randomly sampled objects for training. The processor 172 may randomly sample objects concurrently depicted at a certain point in time and/or sample objects depicted at different times in the video. Additionally, in cases where a certain portion of a scene does not have a sufficient number of objects for proper decision tree training, the processor 172 may randomly sample objects from another time in the video or from other portions of the scene at the same time in the video for use in generating positive and negative examples. Randomly sampling objects may comprise dividing a scene into equal regions and selecting an equal number of samples from each of those regions based on a predetermined total number of required samples (e.g., 1,000).

It is contemplated that any part of any aspect or embodiment discussed in this specification can be implemented or combined with any part of any other aspect or embodiment discussed in this specification.

While the above description provides examples of the embodiments, it will be appreciated that some features and/or functions of the described embodiments are susceptible to modification without departing from the spirit and principles of operation of the described embodiments. Accordingly, what has been described above has been intended to be illustrated non-limiting and it will be understood by persons skilled in the art that other variants and modifications may be made without departing from the scope of the invention as defined in the claims appended hereto.

The invention claimed is:

1. A method comprising:
   obtaining a first object detection of an object depicted in a video that is generated using a first object detector;
   obtaining a second object detection of the object depicted in the video that is generated using a second object detector, wherein the second object detector requires more computational resources than the first object detector to detect the object;
   determining whether:
      a similarity between the first and second object detections satisfies a similarity threshold; or
      a difference between the first and second object detections satisfies a difference threshold;
   when the similarity between the first and second object detections satisfies the similarity threshold, storing the first object detection as a positive example for supervised machine learning training; and
   when the difference between the first and second object detections satisfies the difference threshold, storing the first object detection as a negative example for supervised machine learning training.

2. The method of claim 1, wherein the first object detector is implemented on a camera, and the second object detector is implemented using a server networked to the camera.

3. The method of claim 1, further comprising receiving a video clip generated from the video, wherein the video clip comprises a portion of the video with which the first object detector detects the object and wherein the second object detector uses the video clip to detect the object.

4. The method of claim 3, wherein the first object detector is implemented on a camera, the second object detector is implemented using a server networked to the camera, the camera generates the video clip, and the server receives the video clip from the camera.

5. The method of claim 3, wherein the first object detector is implemented on a camera, the second object detector is implemented using a server networked to the camera, the camera generates the video clip and sends the video clip to networked storage, and the server receives the video clip from the networked storage.

6. The method of claim 1, wherein the similarity threshold comprises a minimum intersection over union between the first and second object detections, and a minimum confidence level of the second detection.

7. The method of claim 1, wherein the difference threshold comprises a maximum intersection over union between the first and second object detections, and a maximum confidence level of the second detection.

8. The method of claim 1, wherein the difference threshold comprises a maximum intersection over union between the first and second object detections for all confidence levels of the second detection.

9. The method of claim 1, wherein the second object detector comprises convolutional neural networks performing object detection concurrently.

10. The method of claim 1, further comprising training a decision tree using at least one of the positive and negative examples.

11. The method of claim 10, wherein the decision tree is trained using at least 1,000 of the positive and negative examples.

12. A server, comprising:
a processor;
a network interface controller, communicatively coupled to the processor and operable to interface with a camera; and
a memory device communicatively coupled to the processor and having stored thereon computer program code that is executable by the processor and that, when executed by the processor, causes the processor to perform a method comprising:
   obtaining a first object detection of an object depicted in a video that is generated using a first object detector;
   obtaining a second object detection of the object depicted in the video that is generated using a second object detector, wherein the second object detector requires more computational resources than the first object detector to detect the object;
   determining whether:
      a similarity between the first and second object detections satisfies a similarity threshold; or
      a difference between the first and second object detections satisfies a difference threshold;
   when the similarity between the first and second object detections satisfies the similarity threshold, storing the first object detection as a positive example for supervised machine learning training; and
   when the difference between the first and second object detections satisfies the difference threshold, storing the first object detection as a negative example for supervised machine learning training.

13. The server of claim 12, wherein the first object detector is implemented on the camera, and the second object detector is implemented using the server.

14. The server of claim 12, wherein the method further comprises receiving a video clip generated from the video, wherein the video clip comprises a portion of the video with which the first object detector detects the object and wherein the second object detector uses the video clip to detect the object.

15. The server of claim 14, wherein the first object detector is implemented on the camera, the second object detector is implemented using the server, the camera generates the video clip, and the server receives the video clip from the camera.

16. The server of claim 14, wherein the first object detector is implemented on the camera, the second object detector is implemented using the server, the camera generates the video clip and sends the video clip to networked storage, and the server receives the video clip from the networked storage.

17. The server of claim 12, wherein the similarity threshold comprises a minimum intersection over union between the first and second object detections, and a minimum confidence level of the second detection.

18. The server of claim 12, wherein the difference threshold comprises a maximum intersection over union between the first and second object detections, and a maximum confidence level of the second detection.

19. The server of claim 12, wherein the difference threshold comprises a maximum intersection over union between the first and second object detections for all confidence levels of the second detection.

20. The server of claim 12, wherein the second object detector comprises convolutional neural networks performing object detection concurrently.

21. The server of claim 12, wherein the method further comprises training a decision tree using at least one of the positive and negative examples.

22. The server of claim 21, wherein the decision tree is trained using at least 1,000 of the positive and negative examples.

23. A memory device having stored thereon computer program code that is executable by a processor and that, when executed by the processor, causes the processor to perform a method comprising:
   (a) obtaining a first object detection of an object depicted in a video that is generated using a first object detector;
   (b) obtaining a second object detection of the object depicted in the video that is generated using a second object detector, wherein the second object detector requires more computational resources than the first object detector to detect the object;
   (c) determining whether:
      (i) a similarity between the first and second object detections satisfies a similarity threshold; or
      (ii) a difference between the first and second object detections satisfies a difference threshold;
   (d) when the similarity between the first and second object detections satisfies the similarity threshold, storing the first object detection as a positive example for supervised machine learning training; and
   (e) when the difference between the first and second object detections satisfies the difference threshold, storing the first object detection as a negative example for supervised machine learning training.

24. The memory device of claim 23, wherein the first object detector is implemented on a camera, and the second object detector is implemented using a server networked to the camera.

25. The memory device of claim 23, further comprising receiving a video clip generated from the video, wherein the video clip comprises a portion of the video with which the first object detector detects the object and wherein the second object detector uses the video clip to detect the object.

26. The memory device of claim 25, wherein the first object detector is implemented on a camera, the second object detector is implemented using a server networked to the camera, the camera generates the video clip, and the server receives the video clip from the camera.

27. The memory device of claim 25, wherein the first object detector is implemented on a camera, the second object detector is implemented using a server networked to the camera, the camera generates the video clip and sends the video clip to networked storage, and the server receives the video clip from the networked storage.

28. The memory device of claim 23, wherein the similarity threshold comprises a minimum intersection over union between the first and second object detections, and a minimum confidence level of the second detection.

29. The memory device of claim 23, wherein the difference threshold comprises a maximum intersection over union between the first and second object detections, and a maximum confidence level of the second detection.

30. The memory device of claim 23, wherein the difference threshold comprises a maximum intersection over union between the first and second object detections for all confidence levels of the second detection.

31. The memory device of claim 23, wherein the second object detector comprises convolutional neural networks performing object detection concurrently.

32. The memory device of claim 23, further comprising training a decision tree using at least one of the positive and negative examples.

33. The memory device of claim 32, wherein the decision tree is trained using at least 1,000 of the positive and negative examples.

* * * * *